I. NELSON.
SCISSORS GUIDE AND TAPE MEASURE.
APPLICATION FILED MAY 15, 1916.
1,218,798.
Patented Mar. 13, 1917.
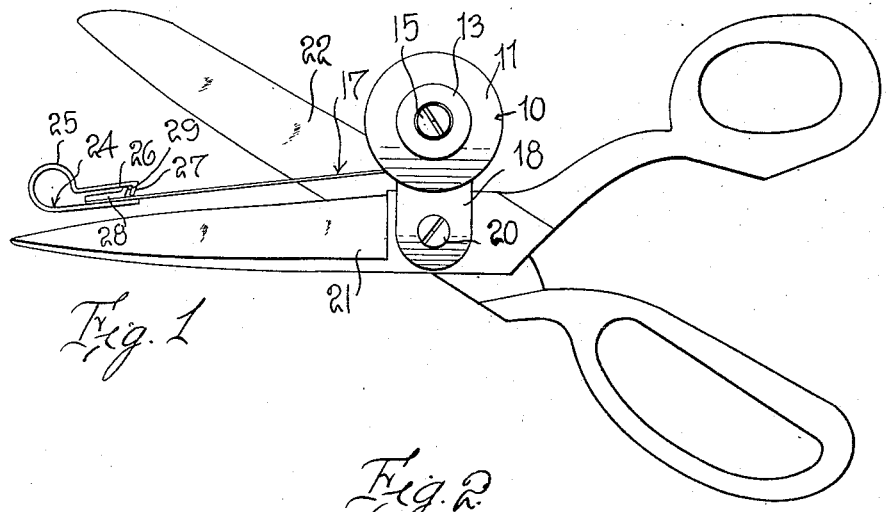
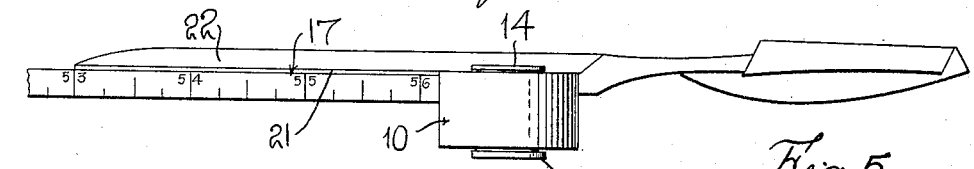
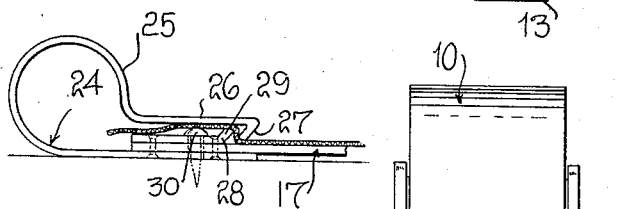
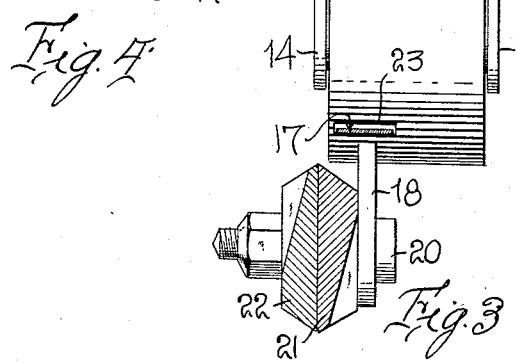
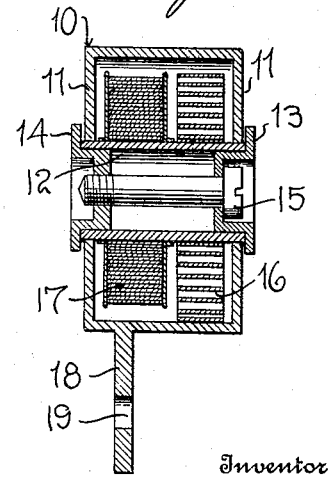
Inventor
IDA NELSON
By Watson E. Coleman
Attorney

UNITED STATES PATENT OFFICE.

IDA NELSON, OF GIBSON CITY, ILLINOIS.

SCISSORS-GUIDE AND TAPE-MEASURE.

1,218,798.　　　　　Specification of Letters Patent.　　Patented Mar. 13, 1917.

Application filed May 15, 1916. Serial No. 97,680.

*To all whom it may concern:*

Be it known that I, IDA NELSON, a citizen of the United States, residing at Gibson City, in the county of Ford and State of Illinois, have invented certain new and useful Improvements in Scissors-Guides and Tape-Measures, of which the following is a specification, reference being had to the accompanying drawings.

This invention relates to attachments for shears, scissors or other cutting implements of like character, and the general object is to provide, in connection with a pair of scissors, a tape measure which is so attached to the shears or scissors that it will act as a guide in cutting.

A further object is to provide a scissors guide and tape measure which is attachable to any pair of shears of the ordinary make, and which is adapted for use with shears, scissors, snips or the like.

A further object is to provide a scissors guide and tape measure in which the end of the tape measure is provided with means for engaging it with a piece of goods, and in this connection to provide for automatically reeling up the tape measure as the shears are moved through the goods.

A further object is to provide, in connection with a tape-measure reel adapted to be mounted upon a pair of shears, a tape measure having thereon at its end a clamp for engaging it over the edge of a piece of goods, or a thumb tack carried by the clamp and adapted to be inserted through the goods and into a table to hold the goods firmly while being cut.

Still another object is to provide a tape measure reel so constructed that when mounted upon a pair of shears or scissors the tape will be discharged from the reel in approximate contact with the cutting edges of the blades.

Other objects will appear in the course of the following description.

The invention is illustrated in the accompanying drawings, wherein:

Figure 1 is an elevation of a pair of shears with my invention applied thereto;

Fig. 2 is a top plan view of one blade of the shears with my tape measure applied thereto;

Fig. 3 is a sectional view through the shears with the reel housing in elevation;

Fig. 4 is a detail side elevation of the clip on the extremity of the tape; and

Fig. 5 is a vertical sectional view through the housing and the supporting lug.

Referring to these figures, it will be seen that my attachment comprises a reel housing designated generally 10, which comprises a peripheral wall and side walls 11, the inner edges of the side walls defining a central opening. Within this central opening is mounted the drum 12 which extends out to the outer faces of the side walls 11, this drum and the housing being held in proper relative position by the oppositely disposed caps 13 and 14, each cap being countersunk at its middle and the caps when in position being connected by means of a screw 15. Disposed within the housing is a spring 16 operatively connected to the housing and the reel drum so as to cause the latter to wind up, and wrapped upon the drum is a tape measure 17. This measure is relatively narrow and may be of any desired length, but is illustrated as having a length somewhat over 56 inches. Extending from the housing 10 is a lug 18 which is perforated at 19 for the passage of the pivot screw 20 of the shear blades 21 and 22. The shears formed by the shear blades 21 and 22 are of any suitable character, but it will be understood that the drawing is purely illustrative in this respect inasmuch as the invention may be applied to all forms of scissors or shears or implements of like character. It will likewise be seen that the lug 19 is so disposed on the housing that when the housing is in place upon the shears, as illustrated in Fig. 3, the housing will be disposed entirely to one side of the blade 22 so that the blade 22 may have free movement to open or close. The housing is of course provided with a slot 23 through which the tape 17 extends.

Mounted upon the free extremity of the tape 17 is a clip whereby the end of the tape may be connected to a piece of cloth and also connected to a cutting table or like article. This clip, as illustrated, comprises a strip of metal more or less resilient, designated 24, which is attached for a certain distance to the face of the extremity of the tape, then curves upward and over to form a loop 25 and then extends parallel to the tape, the extremity of this tongue 26 being downwardly and inwardly bent as at 27 to form a slight hook. The resilience of the loop 25 causes this tongue 26 to be urged downward against the tape.

Disposed upon the upper face of the tape is a metallic strip 28, one extremity of which is upwardly and outwardly turned as at 29 and the hook-shaped end 27 of the tongue 26 engages over this upturned extremity of the strip 28. Passing through the strip 28, which is attached to the upper face of the tape and to the strip 24 in any suitable manner as by rivets, is a thumb tack 30 which is held in place by the pressure of the tongue 26. If it is desired to remove the thumb tack it is only necessary to force the upper portion of the member 24 away from the extremity 29 and then lift it up against the resilient force of the loop 25 and then the thumb tack may be removed or a new one applied. Ordinarily, however, the tongue 26 holds the thumb tack in its projected position and prevents its accidental removal. Now the clip formed by the strip 24 may be engaged either with the edge of a piece of cloth by placing this edge between the tongue 26 and the strip 28, or by forcing the point of the thumb tack 30 downward through the piece of cloth and into a table, or the thumb tack may be engaged with the cutting table and then the clamp of the clip opened to permit the insertion of a piece of cloth.

The practical use of my invention is obvious from the drawings. Attention is called to the fact that one edge of the tape measure 17 is approximately in contact with the inner face of the blade 22 and approximately in line with the inner face of the blade 21 so that this edge of the tape measure forms an absolute guide for the shears or scissors, and further it is pointed out that as the cloth is cut the tape measure is wound up so that the measure automatically shortens as the length of the cut is increased. Furthermore, by reason of the particular construction of the reel housing, it is a relatively easy matter to disassemble the parts or assemble them so as to replace a damaged tape measure or a damaged spring. It will be understood of course that the tape 17 may be of any suitable flexible material and need not be of textile fabric but may be made of steel or other sheet metal, and furthermore, while I have illustrated it as divided into inches and fractions of an inch, it is obvious that it may be graduated in any desired manner.

While I have illustrated certain details of construction which I believe to be particularly effective, it is to be understood of course that these details may be changed in many ways without departing from the spirit of the invention.

Having described the invention, what I claim is:

1. The combination with a pair of shears, of a reel housing mounted upon one blade of the shears and having a transverse slot, the housing being so disposed that one end of the slot is approximately disposed in the same plane as the inner face of one of the shear blades, a spring actuated drum disposed within the housing, and a graduated tape attached to the drum and passing out through said slot, one edge of the tape being approximately coincident with the confronting edges of the shear blades.

2. An attachment for shears comprising a tape housing, a spring actuated drum therein, a tape attached to the drum and passing out through said housing, and a spring actuated clip attached to the extremity of the tape and extending over the top of the tape, the clip being provided with a downwardly extending prong projecting below the under surface of the clip.

3. An attachment for shears comprising a tape housing, a spring actuated drum therein, a tape attached to the drum and passing out through said housing, and a clip attached to the extremity of the tape comprising a strip of metal attached to the under face of the tape and being bent to form a resilient loop and a tongue extending parallel to the first part of the strip, the tongue being hook-shaped at its extremity, and a strip attached to the upper face of the tape and having an upwardly and outwardly extending extremity with which the hook-shaped end of the first-named strip is adapted to be engaged and latched.

4. An attachment for shears comprising a tape housing, a spring actuated drum therein, a tape attached to the drum and passing out through said housing, a thumb tack carried by the extremity of the tape, and a resilient clip having a portion through which the thumb tack passes and having a portion pressing down and depressibly engaging the head of the thumb tack.

5. The combination with a pair of shears, of a real housing mounted thereon, a spring actuated tape drum mounted in said housing and exerting a continual pull upon the tape to retract it into the housing, and a device on the extremity of the tape for holding it engaged with the material to be cut and with a cutting board whereby the tape will reel up within the housing as the shears approach the extremity of the tape.

In testimony whereof I hereunto affix my signature in the presence of two witnesses.

IDA NELSON.

Witnesses:
J. W. MORE,
WARREN CLIMPSON.

Copies of this patent may be obtained for five cents each, by addressing the "Commissioner of Patents, Washington, D. C."